(No Model.) 2 Sheets—Sheet 2.

G. D. BURTON.
ELECTRIC WELDING OR BRAZING MECHANISM.

No. 523,957. Patented July 31, 1894.

WITNESSES.
Suzie M. Dosett.
Ian G. Cameron.

INVENTOR.
Geo. D. Burton
By H. C. Somes,
Attorney.

UNITED STATES PATENT OFFICE.

GEORGE D. BURTON, OF BOSTON, MASSACHUSETTS.

ELECTRIC WELDING OR BRAZING MECHANISM.

SPECIFICATION forming part of Letters Patent No. 523,957, dated July 31, 1894.

Application filed June 3, 1893. Serial No. 476,423. (No model.)

*To all whom it may concern:*

Be it known that I, GEORGE D. BURTON, of Boston, in the county of Suffolk and State of Massachusetts, have invented a new and useful Improvement in Electric Welding or Brazing Mechanism, of which the following is a specification.

My invention relates to electric welding and brazing mechanisms, and it consists in the new and useful combination of parts thereof substantially as hereinafter described and claimed.

Figure 1:
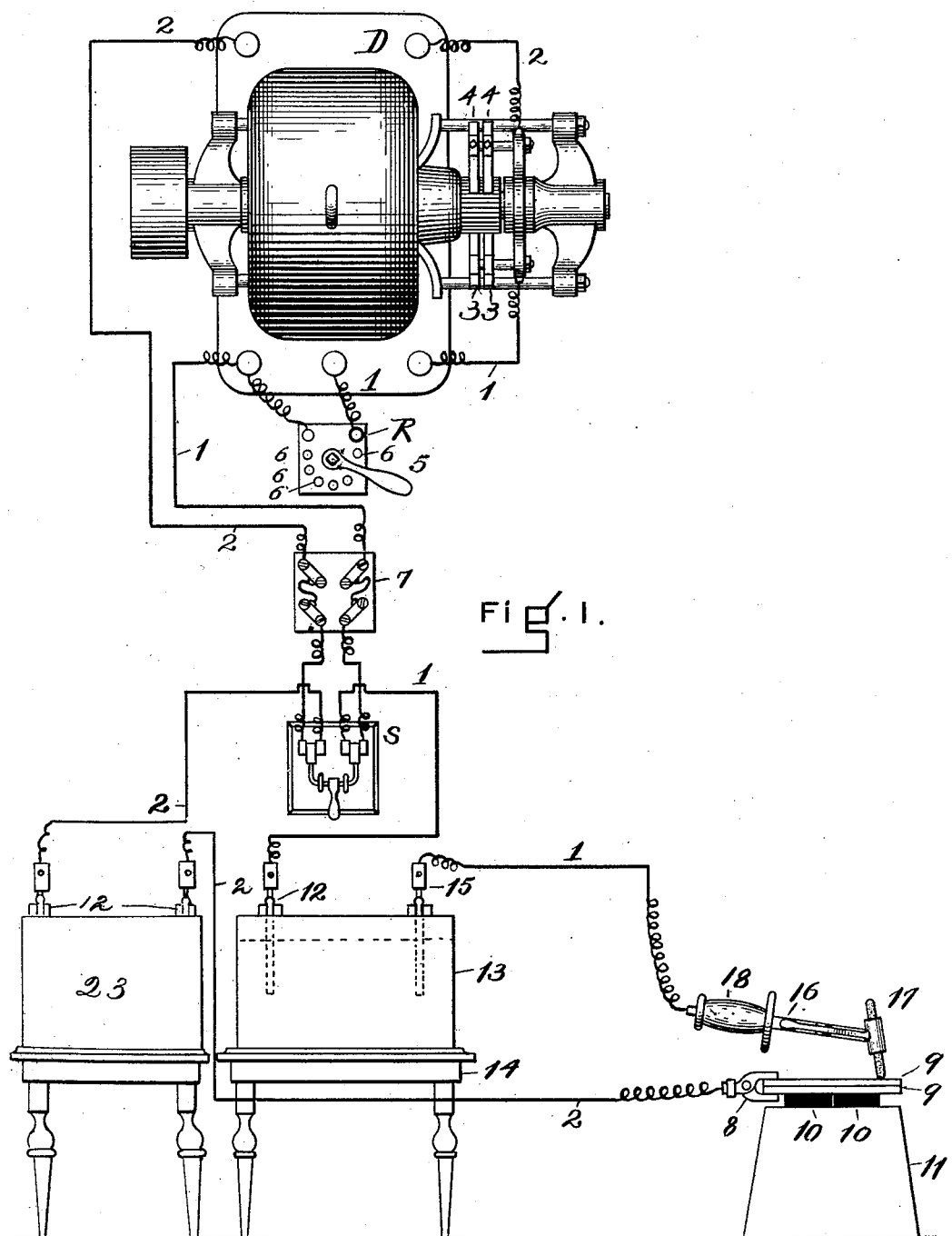
Figure 2:
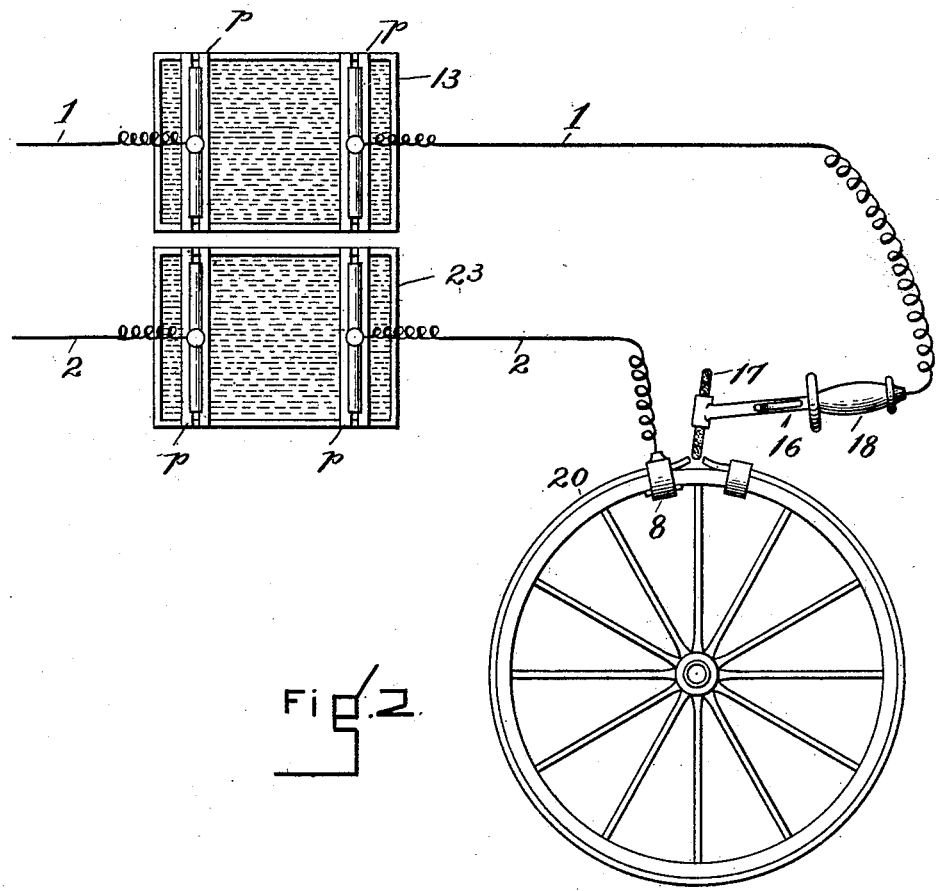
Figure 3:
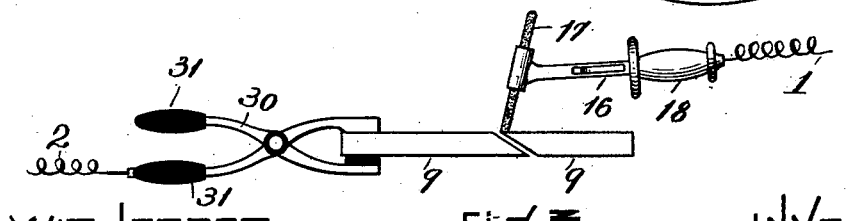

In the drawings: Figure 1 is a side elevation of my electric welding and brazing apparatus, with the dynamo switches, &c., in plan view connected thereto. Fig. 2 shows the use of two liquid resistance cells in top plan view and the electric welding apparatus, as applied to welding a wheel tire, in side view. Fig. 3 shows the method of employing my apparatus to weld a lap joint in metal plates.

The method of applying the electric current to welding or brazing which I employ with this invention, is that of the direct application of the electric arc.

D is a constant current self-exciting dynamo of the usual construction, having the positive and negative circuit wires 1, 2, leading from its brushes 3 and 4. The rheostat, R, is located in the circuit wire, 1, provided with the dial handle, 5, which swings around in contact with the dial points, 6, to regulate the delivery of the current.

7 is the safety plug, which is placed in both parts of the circuit 1 and 2 to guard against excess of current which would burn out the dynamo.

S is a double switch of the usual construction, switching in or out both wires 1 and 2 simultaneously. From the switch the wire, 2, leads to the clamp, 8, which holds together the two plates of metal, 9, 9, which are to be welded together. These plates lie upon the insulating material, 10, 10, which rest upon the anvil or support 11. From the switch, S, the wire 1 leads to the electrode, 12, which is immersed in the liquid of the cell 13. This cell is formed of non-conducting material, as wood, for instance, and is supported by a wooden table, 14. Another electrode, 15, is immersed in the liquid of the cell near its opposite side, and the circuit wire 1 leads from this electrode through the handle of the tool, 16, to the carbon pencil, 17, as shown. The handle, 18, of the tool, 16, is made of non-conducting material and the wires, 1, 2, between the tool and the clamp, 8, at one end and the switch are preferably protected by an insulating coating, to avoid danger to the operator. The liquid medium in the cell, 13, through which the current is obliged to pass, may be water, or salt and water, or a solution of soda in water, or some other similar solution, according to the nature of the arc desired to be produced for the brazing or welding process.

The particular improvement which I have made is the employment with the carbon pencil, or its equivalent, to produce an electric arc for brazing or welding, of the liquid containing cell, 13, so disposed as to force the current of electricity to flow through the liquid therein as a part of the circuit. It is found in practice that the presence of this cell in the circuit, when of proper size and with the electrodes 12 and 15 at a proper distance apart, renders the electric arc formed between the carbon pencil 17 and the metal plates, 9, substantially continuous and steady within a reasonable range of movement of the carbon pencil toward or away from the metal plates. To insure the accurate working of this cell, the distance between the electrodes is made adjustable in the following manner: The electrodes are attached to cross-pieces, p, p, which are long enough to rest on the edges of the cell and be slid along toward or from each other, bearing the electrodes with them. To approach the electrodes in this manner is to decrease the electricity held in saturation in the cell while to draw them apart serves to increase the electricity held by the fluid in saturation in the cell. Thus any variation in the electric current from the dynamo may be met by the proper regulation of it in the cell; since a stronger current will be steadied and equalized by a larger amount of electricity retained in saturation and passing through the liquid at one time.

If the liquid cell, 13, be omitted and the wire, 1, be made continuous from the switch to the tool, 16, the practical difficulty with the use of the arc for welding or brazing metals exists, that the arc will break and require to be continually re-established by touching the carbon pencil to the metal and drawing away again, and the arc will spit or sputter causing it to strike red-hot particles of metal off the surface of the plate where it makes connection with it, and the surface of the work will be left pitted and scarred by the burning away of these particles of metal. This appears to be due to the fact that parts of the arc are intermittently more active and energetic than the larger portion of it, so that the application of the arc for a sufficient length of time to enable the larger portion of it to effect its work gives opportunity for the intermittent action of small portions of it acting more energetically to impair the work done. By the use of the liquid cell, 13, these difficulties are overcome and the electric arc flows in a constant stream from the carbon pencil, 17, to the metal, and welds or brazes up all the parts of it affected by the heat of the arc evenly, and the ordinary involuntary motions of the hand of the operator in guiding the tool, 16, along the path to be operated on will not cause sufficient variation of distance between the carbon pencil, 17, and the metal plates, 9, to continually break the arc and destroy its action or make it too irregular for practical use, as is the case when the liquid cell, 13, is omitted from the circuit.

In many cases it will be found that the use of a second liquid cell, 23, in the circuit, 2, will give a steadier and more satisfactory operation of the electric arc than with the single cell 13, as is shown in Fig. 2. In this case the clamp 8 is attached to the wheel tire, 20, and the carbon pencil 17 is employed to fuse the ends of the tire together on the wheel, the heating of the metal of the tire in fusing it together causing it to expand so that the ends will be brought together from the position shown, while the cooling of the tire afterward will cause it to contract firmly around the wheel.

In Fig. 3 the metal plates 9, 9, are shown as being united with a lap joint, the clamp 8 being replaced by the tongs, 30, to which the wire 2 is connected. These tongs have their pivoted jaws and handles arranged to clamp one of the metal plates, while insulated coverings 31, are placed on the handles so that one of the plates, 9, may be moved nearer to or farther from the other to regulate the lap weld that is to be made between them.

The pencil might, of course, be made of some proper metallic substance, instead of carbon, so that the point should be melted off as it is drawn along the line of the lap and united with the brazing material, or with the plates themselves, so as to make a better joint, or the pencil may be made of some other refractory material, or metal, than carbon.

In Figs. 1 and 3, the pencil is shown not in the position in which it effects the welding, but in the preliminary position in which it is touched to the substance. It is then drawn away as shown in Fig. 2 and thus the welding arc is formed. In this position of slight separation it is moved along close to the line of welding, and the arc thus performs its function.

What I claim as new and of my invention is—

1. The combination of an electric generator, an electric circuit containing it, a rheostat, an electric arc welding or brazing mechanism consisting of a conducting pencil forming the extremity of one member of the circuit, and an electric conducting clamp forming the extremity of the other member of the circuit and arranged to be connected to the metal to be welded or brazed, and liquid containing cells one of said cells being introduced into the circuit between said rheostat and the welding mechanism, the positive wire of the circuit leading directly from one cell to the conducting pencil, and the negative wire of said circuit from the clamp directly to the other cell, substantially as described.

2. The combination of an electric generator, an electric circuit containing it, a rheostat, an electric arc welding or brazing mechanism consisting of a conducting pencil forming the extremity of one member of the circuit and an electric conducting clamp forming the extremity of the other member of the circuit and arranged to be connected to the metal to be welded or brazed, and liquid containing cells introduced into the circuit, the positive wire of said circuit leading directly from one cell to the conducting pencil, and the negative wire of said circuit from the clamp directly to the other cell, substantially as set forth.

GEO. D. BURTON.

Witnesses:
E. F. PHILIPSON,
H. H. RIDEOUT.